United States Patent
Mitsui et al.

(10) Patent No.: US 7,332,628 B2
(45) Date of Patent: Feb. 19, 2008

(54) PROCESS FOR PRODUCING CARBONYL FLUORIDE

(75) Inventors: Yuki Mitsui, Tokyo (JP); Taisuke Yonemura, Tokyo (JP); Yutaka Ohira, Tokyo (JP); Akira Sekiya, Tsukuba (JP)

(73) Assignees: National Institute of Advanced Industrial Science and Technology, Tokyo (JP); Asahi Glass Company, Limited, Tokyo (JP); Kanto Denka Kogyo Co., Ltd., Tokyo (JP); Showa Denko Kabushiki Kaisha, Tokyo (JP); Daikin Industries, Ltd., Osaka-shi (JP); Hitachi Kokusai Electric Inc., Tokyo (JP)

( * ) Notice: Subject to any disclaimer, the term of this patent is extended or adjusted under 35 U.S.C. 154(b) by 22 days.

(21) Appl. No.: 10/548,836

(22) PCT Filed: Mar. 12, 2004

(86) PCT No.: PCT/JP2004/003328

§ 371 (c)(1),
(2), (4) Date: Sep. 13, 2005

(87) PCT Pub. No.: WO2004/080894

PCT Pub. Date: Sep. 23, 2004

(65) Prior Publication Data

US 2006/0194985 A1   Aug. 31, 2006

(30) Foreign Application Priority Data

Mar. 14, 2003 (JP) ............................. 2003-070342

(51) Int. Cl.
*C07C 51/58* (2006.01)
(52) U.S. Cl. ...................................................... 562/848
(58) Field of Classification Search .................... None
See application file for complete search history.

(56) References Cited

U.S. PATENT DOCUMENTS 6,787,053 B2 * 9/2004 Sekiya et al. ................. 216/58

FOREIGN PATENT DOCUMENTS

| JP | 10-511096 | 10/1998 |
| JP | 11-116216 | 4/1999 |
| JP | 2002-515011 | 5/2002 |
| JP | 2003-267712 * | 9/2003 |
| WO | WO 02/23608 A1 * | 3/2002 |

OTHER PUBLICATIONS

Brauer, Handbook of Preparative Inorganic Chemistry, vol. 1, 2nd edition, pp. 206-208 1963.

* cited by examiner

*Primary Examiner*—Paul A. Zucker
(74) *Attorney, Agent, or Firm*—Oblon, Spivak, McClelland, Maier & Neustadt, P.C.

(57) ABSTRACT

The process for producing carbonyl fluoride according to the invention is a process for safely and easily producing high-purity carbonyl fluoride having a low content of carbon tetrafluoride, and comprises feeding carbon monoxide and fluorine to a reactor and allowing carbon monoxide to react with fluorine under the conditions of a reactor internal pressure of less than atmospheric pressure.

23 Claims, 1 Drawing Sheet

PROCESS FOR PRODUCING CARBONYL FLUORIDE

FIELD OF THE INVENTION

The present invention relates to a process for producing carbonyl fluoride. More particularly, the invention relates to a process for producing high-purity carbonyl fluoride by allowing carbon monoxide to react with fluorine.

BACKGROUND OF THE INVENTION

Carbonyl fluoride has been conventionally produced by a process comprising allowing phosgene to react with a fluorinating agent such as hydrogen fluoride or antimony trifluoride or a process comprising allowing carbon monoxide to react with silver difluoride (Japanese Patent Laid-Open Publication No. 116216/1999). In the carbonyl fluoride produced by the above processes, however, by-products such as hydrogen chloride or silver fluoride are contained. In order to use this carbonyl fluoride as a cleaning gas for a plasma-CVD apparatus that is used in a semiconductor manufacturing process, it is necessary to highly purify the crude carbonyl fluoride obtained by the above processes.

It is known that $COF_2$ can be produced by allowing carbon monoxide to directly react with fluorine (Handbook of Preparative Inorganic Chemistry, Vol. 1, 2nd ed., pp. 206-208, edited by Georg Brauer (Translation editor), Academic Press, New York (1963)). However, it is said that if reaction of fluorine is carried out in a carbon monoxide atmosphere in this process, there is a risk of fierce explosion, and therefore, a process of allowing carbon monoxide to directly react with fluorine under the conditions of excess fluorine is usually used. In this case, carbon tetrafluoride ($CF_4$) is formed as a by-product. This $CF_4$ has an extremely high global warming potential (value of integral time of 100 years) of 5,700 times that of $CO_2$ and has a problem of a fear of harmful impact on the environment. Accordingly, development of a process for producing carbonyl fluoride wherein formation of $CF_4$ is suppressed has been desired.

In the conventional process for producing carbonyl fluoride, further, carbon monoxide and fluorine are allowed to react with each other under the conditions of excess fluorine, so that in the crude carbonyl fluoride obtained after the reaction, fluorine is frequently contained. Both carbonyl fluoride and fluorine are gases at ordinary temperature, and in order to separate them, it is necessary to liquefy or solidify one of these components by a low-temperature treatment, a pressure treatment or the like to separate it from the other component.

OBJECT OF THE INVENTION

The present invention is intended to solve such problems associated with the prior art as described above, and it is an object of the invention to provide a process for producing carbonyl fluoride safely and easily. It is another object of the invention to provide a process for producing high-purity carbonyl fluoride by suppressing formation of $CF_4$ during the course of a reaction of carbon monoxide with fluorine.

SUMMARY OF THE INVENTION

The present inventors have earnestly studied to solve the above problems and has found that with decrease in a pressure or with increase in a molar ratio of carbon monoxide to fluorine ($CO/F_2$), temperature rise inside the reactor is inhibited and high-purity carbonyl fluoride can be produced more safely and more easily. The present inventors have also found that formation of carbon tetrafluoride can be suppressed by mixing fluorine with nitrogen.

That is to say, a first process for producing carbonyl fluoride according to the invention comprises feeding carbon monoxide and fluorine to a reactor and allowing carbon monoxide to react with fluorine under the conditions of a reactor internal pressure of less than atmospheric pressure.

A second process for producing carbonyl fluoride according to the invention comprises feeding carbon monoxide and fluorine to a reactor in a molar ratio ($CO/F_2$) of not less than 1.0 to allow carbon monoxide to react with fluorine.

A third process for producing carbonyl fluoride according to the invention comprises previously mixing fluorine with nitrogen and feeding carbon monoxide and the mixed gas of fluorine and nitrogen to a reactor to allow carbon monoxide to react with fluorine.

A fourth process for producing carbonyl fluoride according to the invention comprises:

(I) a reaction step of feeding at least carbon monoxide and fluorine to a reactor to allow carbon monoxide to react with fluorine, and (II) a purification step of purifying crude carbonyl fluoride obtained in the reaction step (I), wherein the crude carbonyl fluoride contains at least fluorine, and the purification step (II) is a step of purifying the carbonyl fluoride by mixing the crude carbonyl fluoride with a compound (A) which is reactive to fluorine but inactive to carbonyl fluoride to form a reaction product (a) of fluorine and the compound (A) and removing the reaction product (a).

In the fourth process for producing carbonyl fluoride, carbon monoxide is preferably allowed to react with fluorine under the conditions of a reactor internal pressure of less than atmospheric pressure.

In the first, the third and the fourth processes for producing carbonyl fluoride, carbon monoxide and fluorine are preferably fed to a reactor in a molar ratio ($CO/F_2$) of not less than 1.0.

In the first, the second and the fourth processes for producing carbonyl fluoride, it is preferable that fluorine is previously mixed with nitrogen, and carbon monoxide and the mixed gas of fluorine and nitrogen are fed to a reactor.

In the first to the fourth processes for producing carbonyl fluoride, the mixing molar ratio of fluorine to nitrogen ($F_2/N_2$) is preferably not more than 1.5, the temperature inside the reactor is preferably not higher than the endurable temperature of the reactor, the yield of carbonyl fluoride is preferably not less than 95% by mol, and the reaction selectivity of carbon tetrafluoride is preferably not more than 2.0% by mol.

Figure 1:
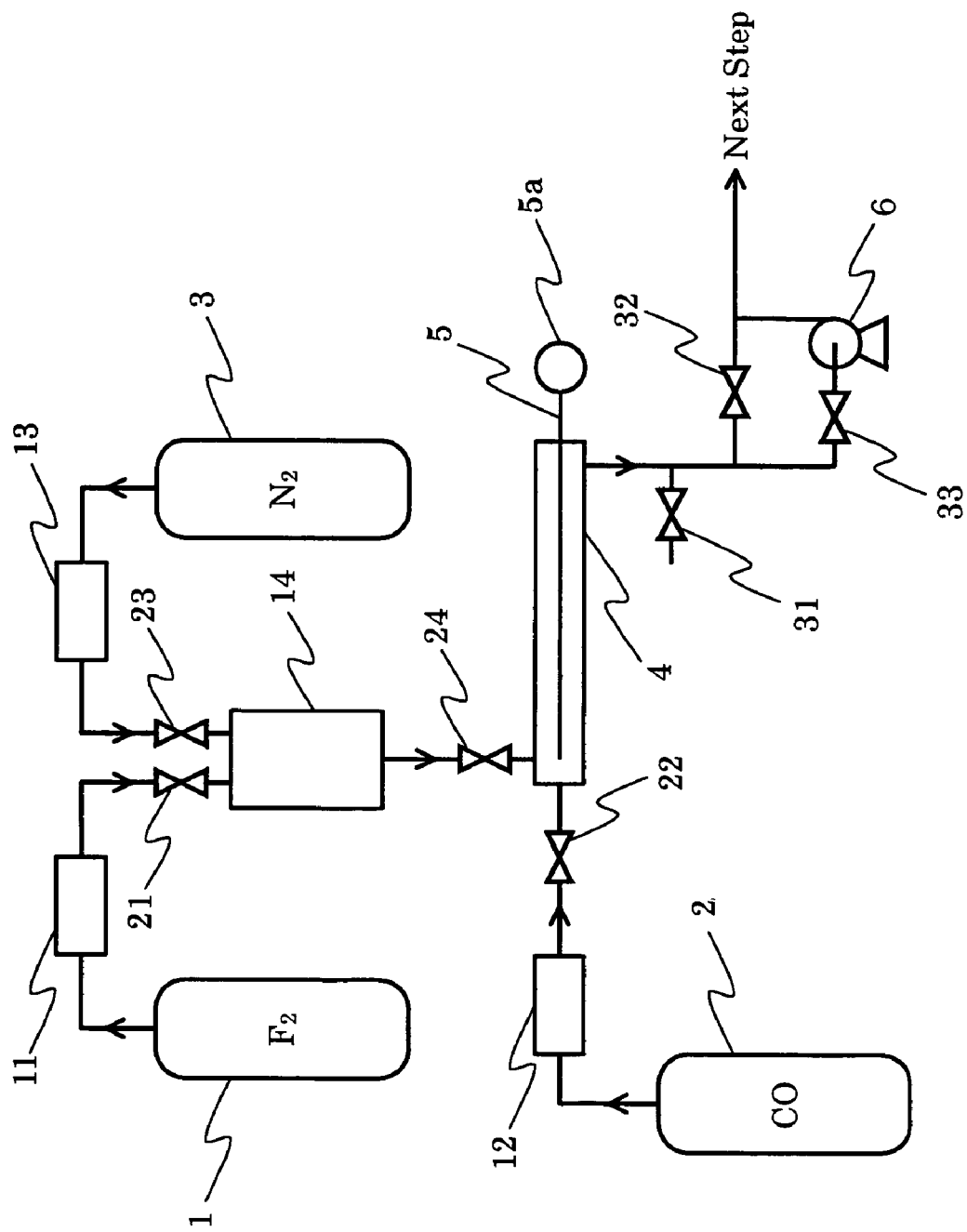
FIG. 1 shows a carbonyl fluoride production apparatus used in the present invention. Meanings of numerals in FIG. 1 are as follows.

1: fluorine storage tank
2: carbon monoxide storage tank
3: nitrogen storage tank
4: reactor
5: thermometer
5a: temperature indicator
6: pressure reducing pump
11: fluorine gas flow controller
12: carbon monoxide gas flow controller 13: nitrogen gas flow controller
14: gas-mixing unit
21-24, 31-33: valve

PREFERRED EMBODIMENTS OF THE INVENTION

The process for producing carbonyl fluoride according to the invention is described in detail hereinafter.

As the carbon monoxide, fluorine and nitrogen for the invention, those commercially available can be employed.

In the process for producing carbonyl fluoride according to the invention, the reaction of carbon monoxide with fluorine may be carried out by any of a batch system and a flow system, but preferably employed is a flow system using, for example, such a carbonyl fluoride production apparatus as shown in FIG. 1.

First, the carbonyl fluoride production apparatus shown in FIG. 1 is described. This production apparatus has a fluorine storage tank 1 and a carbon monoxide storage tank 2, and may further have a nitrogen storage tank 3 when needed. The fluorine storage tank 1 is connected to a gas-mixing unit 14 through a fluorine gas flow controller 11 and a valve 21. When the nitrogen storage tank 3 is provided, the nitrogen storage tank 3 is connected to the gas-mixing unit 14 through a nitrogen gas flow controller 13 and a valve 23. The gas-mixing unit 14 is connected to an inlet of a reactor 4 through a valve 24. When mixing of fluorine with nitrogen is not carried out, the fluorine storage tank 1 may be directly connected to the inlet of the reactor 4 through the fluorine gas flow controller 11 and the valve 21 without using the gas-mixing unit 14. On the other hand, the carbon monoxide storage tank 2 is connected to the inlet of the reactor 4 through a carbon monoxide gas flow controller 12 and a valve 22.

A thermometer 5 is equipped in the reactor 4, and the temperature inside the reactor 4 can be measured by it. By the use of a temperature indicator 5a, the temperature inside the reactor 4 can be displayed. In the reactor 4, a cooling system may be equipped to remove heat in the reactor. In the production apparatus, one reactor 4 may be used, or two or more reactors 4 may be used in combination.

An outlet of the reactor 4 is connected to a pressure reducing pump 6 through a valve 33, and the pressure reducing pump 6 is connected to an apparatus for the next process. When the pressure inside the reactor 4 is not reduced, the outlet of the reactor 4 may be directly connected to an apparatus for the next process through a valve 32. On the flow path from the outlet of the reactor 4, a valve 31 for controlling the pressure inside the reactor is provided.

First Process for Producing Carbonyl Fluoride

The first process for producing carbonyl fluoride according to the invention comprises feeding carbon monoxide and fluorine to a reactor and allowing carbon monoxide to react with fluorine under the conditions of a reactor internal pressure of less than atmospheric pressure to produce carbonyl fluoride. The first process for producing carbonyl fluoride is specifically described below using a production apparatus shown in FIG. 1, but the present invention is not limited to the process using this apparatus.

In the first place, the pressure inside the reactor 4 is reduced to a prescribed pressure by means of the pressure reducing pump 6. Then, carbon monoxide and fluorine are fed to the reactor 4 from the carbon monoxide storage tank 2 and the fluorine storage tank 1, respectively, to start the reaction. In this feeding, the molar ratio of carbon monoxide to fluorine ($CO/F_2$) is adjusted by controlling flow rates of carbon monoxide and fluorine. The pressure inside the reactor 4 is adjusted to a prescribed pressure of less than atmospheric pressure by controlling the valve 31.

Although the pressure inside the reactor 4 has only to be less than atmospheric pressure, it is preferably not more than 100 kPa, more preferably not more than 97 kPa, still more preferably not more than 95 kPa, particularly preferably 85 to 93 kPa. Since the reaction of carbon monoxide with fluorine is an exothermic reaction, the temperature inside the reactor usually rises with progress of the reaction, but when the pressure inside the reactor is adjusted in the above range, temperature rise inside the reactor can be inhibited or the temperature can be maintained at a given temperature. Further, as the pressure inside the reactor is decreased, temperature rise inside the reactor can be inhibited more effectively or the temperature can be maintained at a lower one. As a result, in the case where the reactor is equipped with a cooling system, the burden on the cooling system can be decreased, and also in the case where the reaction is carried out without a cooling system, the temperature inside the reactor can be maintained at a given temperature.

That is to say, according to the above process, sudden rise in temperature inside the reactor attributable to the reaction of carbon monoxide with fluorine can be prevented, and the temperature inside the reactor can be maintained at a temperature of usually not higher than the endurable temperature of the reactor, preferably not higher than 250° C., more preferably not higher than 200° C., particularly preferably not higher than 150° C. Hence, carbonyl fluoride can be produced more safely. The lower limit of the temperature inside the reactor is not specifically restricted provided that it is a temperature of not lower than room temperature, but in order to obtain carbonyl fluoride efficiently, the lower limit is desired to be preferably 50° C., more preferably 100° C., particularly preferably 120° C. The temperature distribution inside the reactor may be homogeneous or heterogeneous provided that the maximum temperature inside the reactor is not higher than the above-mentioned upper limit and the minimum temperature inside the reactor is not lower than the above-mentioned lower limit.

According to the above process, further, side reactions, such as a reaction of carbon tetrafluoride formation, can be suppressed in the carbonyl fluoride production reaction, and reaction selectivity of carbonyl fluoride can be enhanced. For example, the yield of carbonyl fluoride can be increased to preferably not less than 95% by mol, more preferably not less than 97% by mol, particularly preferably not less than 98% by mol. The term "yield of carbonyl fluoride" used in the present specification means a ratio of actual to theoretical amount of carbonyl fluoride obtained by the reaction of carbon monoxide with fluorine, that is, a ratio calculated by any one of the following formulas (1) to (3).

Under the conditions of excess fluorine:

$$\text{Yield (\%)} = \frac{\text{Amount of carbonyl fluoride produced (mol)}}{\text{Amount of carbon monoxide fed (mol)}} \times 100 \qquad (1)$$

Under the conditions of excess carbon monoxide:

$$\text{Yield (\%)} = \frac{\text{Amount of carbonyl fluoride produced (mol)}}{\text{Amount of fluorine fed (mol)}} \times 100 \quad (2)$$

Under the conditions of equal amounts of carbon monoxide and fluorine:

$$\text{Yield (\%)} = \frac{\text{Amount of carbonyl fluoride produced (mol)}}{\text{Amount of carbon monoxide or fluorine fed (mol)}} \times 100 \quad (3)$$

Furthermore, the reaction selectivity of $CF_4$ can be decreased to preferably not more than 2.0% by mol, more preferably not more than 1.5% by mol. The term "reaction selectivity of $CF_4$" used in the present specification means a molar fraction of $CF_4$ in the reaction products of carbon monoxide and fluorine, and it is determined by the following formula (4).

$$\text{Reaction selectivity (\%)} = \frac{\text{Amount of } CF_4 \text{ formed (mol)}}{\text{Total amount of } CF_4 \text{ formed,} COF_2 \text{ formed and } CO_2 \text{ formed (mol)}} \times 100 \quad (4)$$

In the above process, the $CO/F_2$ ratio is not specifically restricted, but this ratio is desired to be preferably not less than 1.0, more preferably not less than 2.0, particularly preferably 2.0 to 3.0. As the $CO/F_2$ ratio is increased, temperature rise inside the reactor can be more effectively inhibited. Further, when the $CO/F_2$ ratio is not less than 1.0, the reaction of carbon tetrafluoride formation can be easily suppressed, and the reaction selectivity of $CF_4$ can be easily decreased to preferably not more than 2.0% by mol, more preferably not more than 1.5% by mol.

In the first process for producing carbonyl fluoride according to the invention, moreover, carbonyl fluoride can be produced by previously mixing fluorine with nitrogen and feeding this mixed gas and carbon monoxide to a reactor to allow carbon monoxide to react with fluorine. More specifically, in the first place, fluorine and nitrogen are fed to the gas-mixing unit 14 from the fluorine storage tank 1 and the nitrogen storage tank 3, respectively, to prepare a mixed gas of fluorine and nitrogen. Then, the mixed gas and carbon monoxide in the carbon monoxide storage tank 2 are fed to the reactor 4 to start the reaction. In this feeding, the molar ratio of carbon monoxide to fluorine ($CO/F_2$) and the mixing molar ratio of fluorine to nitrogen ($F_2/N_2$) are adjusted by controlling flow rates of carbon monoxide, fluorine and nitrogen.

The $F_2/N_2$ ratio is not specifically restricted, but this ratio is desired to be preferably not more than 1.5, more preferably not more than 1.0, particularly preferably not more than 0.5. When the $F_2/N_2$ ratio is in the above range, the reaction of carbon tetrafluoride formation can be easily suppressed, and the reaction selectivity of carbon tetrafluoride can be easily decreased to preferably not more than 1.0% by mol, more preferably not more than 0.8% by mol, particularly preferably not more than 0.5% by mol.

Second Process for Producing Carbonyl Fluoride

The second process for producing carbonyl fluoride according to the invention comprises feeding carbon monoxide and fluorine to a reactor in a molar ratio ($CO/F_2$) of not less than 1.0 to allow carbon monoxide to react with fluorine and thereby produce carbonyl fluoride. The second process for producing carbonyl fluoride is specifically described below using a production apparatus shown in FIG. 1, but the present invention is not limited to the process using this apparatus.

In the first place, carbon monoxide and fluorine are fed to the reactor 4 from the carbon monoxide storage tank 2 and the fluorine storage tank 1, respectively, to start the reaction. In this feeding, the molar ratio of carbon monoxide to fluorine ($CO/F_2$) is adjusted by controlling flow rates of carbon monoxide and fluorine.

The $CO/F_2$ ratio is usually not less than 1.0, preferably not less than 2.0, more preferably 2.0 to 3.0. When the $CO/F_2$ ratio is in the above range, temperature rise inside the reactor can be inhibited or the temperature can be maintained at a given temperature. As a result, in the case where the reactor is equipped with a cooling system, the burden on the cooling system can be decreased, and also in the case where the reaction is carried out without a cooling system, the temperature inside the reactor can be maintained at a given temperature.

That is to say, according to the above process, sudden rise in temperature inside the reactor attributable to the reaction of carbon monoxide with fluorine can be prevented, and the temperature inside the reactor can be maintained at a temperature of usually not higher than the endurable temperature of the reactor, preferably not higher than 250° C., more preferably not higher than 200° C., particularly preferably not higher than 150° C. Hence, carbonyl fluoride can be produced more safely. The lower limit of the temperature inside the reactor is not specifically restricted provided that it is a temperature of not lower than room temperature, but in order to obtain carbonyl fluoride efficiently, the lower limit is desired to be preferably 50° C., more preferably 100° C., particularly preferably 120° C. The temperature distribution inside the reactor may be homogeneous or heterogeneous provided that the maximum temperature inside the reactor is not higher than the above-mentioned upper limit and the minimum temperature inside the reactor is not lower than the above-mentioned lower limit.

When the $CO/F_2$ ratio is not less than 1.0, side reactions, such as a reaction of carbon tetrafluoride formation, can be suppressed, and the reaction selectivity of carbonyl fluoride can be enhanced. For example, the yield of carbonyl fluoride can be increased to preferably not less than 95% by mol, more preferably not less than 97% by mol, particularly preferably not less than 98% by mol. Further, the reaction selectivity of $CF_4$ can be decreased to preferably not more than 2.0% by mol, more preferably not more than 1.5% by mol.

In the second process for producing carbonyl fluoride according to the invention, moreover, carbonyl fluoride can be produced by previously mixing fluorine with nitrogen and feeding the mixed gas and carbon monoxide to a reactor to allow carbon monoxide to react with fluorine. More specifically, in the first place, fluorine and nitrogen are fed to the gas-mixing unit 14 from the fluorine storage tank 1 and the nitrogen storage tank 3, respectively, to prepare a mixed gas of fluorine and nitrogen. Then, the mixed gas and carbon monoxide in the carbon monoxide storage tank 2 are fed to the reactor 4 to start the reaction. In this feeding, the molar ratio of carbon monoxide to fluorine ($CO/F_2$) and the mixing molar ratio of fluorine to nitrogen ($F_2/N_2$) are adjusted by controlling flow rates of carbon monoxide, fluorine and nitrogen.

The $F_2/N_2$ ratio is not specifically restricted, but this ratio is desired to be preferably not more than 1.5, more preferably not more than 1.0, particularly preferably not more than 0.5. When the $F_2/N_2$ ratio is in the above range, the reaction of carbon tetrafluoride formation can be easily suppressed, and the reaction selectivity of carbon tetrafluoride can be easily decreased to preferably not more than 1.0% by mol, more preferably not more than 0.8% by mol, particularly preferably not more than 0.5% by mol.

Third Process for Producing Carbonyl Fluoride

The third process for producing carbonyl fluoride according to the invention comprises previously mixing fluorine with nitrogen and feeding carbon monoxide and the mixed gas of fluorine and nitrogen to a reactor to allow carbon monoxide to react with fluorine and thereby produce carbonyl fluoride. The third process for producing carbonyl fluoride is specifically described below using a production apparatus shown in FIG. 1, but the present invention is not limited to the process using this apparatus.

In the first place, fluorine and nitrogen are fed to the gas-mixing unit 14 from the fluorine storage tank 1 and the nitrogen storage tank 3, respectively, to prepare a mixed gas of fluorine and nitrogen. Then, the mixed gas and carbon monoxide in the carbon monoxide gas storage tank 2 are fed to the reactor 4 to start the reaction. In this feeding, the molar ratio of carbon monoxide to fluorine ($CO/F_2$) and the mixing molar ratio of fluorine to nitrogen ($F_2/N_2$) are adjusted by controlling flow rates of carbon monoxide, fluorine and nitrogen.

Although the temperature inside the reactor has only to be not higher than the endurable temperature of the reactor, the temperature is desirably maintained at preferably not higher than 250° C., more preferably not higher than 200° C., particularly preferably not higher than 150° C. The lower limit of the temperature inside the reactor is not specifically restricted provided that it is a temperature of not lower than room temperature, but in order to obtain carbonyl fluoride efficiently, the lower limit is desired to be preferably 50° C., more preferably 100° C., particularly preferably 120° C. The temperature distribution inside the reactor may be homogeneous or heterogeneous provided that the maximum temperature inside the reactor is not higher than the above-mentioned upper limit and the minimum temperature inside the reactor is not lower than the above-mentioned lower limit. For maintaining the temperature inside the reactor, a method of removing heat by means of a cooling system with which the reactor is equipped may be used, or a method described in the aforesaid first or second process for producing carbonyl fluoride may be used.

The $F_2/N_2$ ratio is not specifically restricted, but this ratio is desired to be preferably not more than 1.5, more preferably not more than 1.0, particularly preferably not more than 0.5. When the $F_2/N_2$ ratio is in the above range, the reaction of carbon tetrafluoride formation can be easily suppressed, and the reaction selectivity of carbonyl fluoride can be enhanced. For example, the reaction selectivity of carbon tetrafluoride can be easily decreased to preferably not more than 1.0% by mol, more preferably not more than 0.8% by mol, particularly preferably not more than 0.5% by mol. Further, the yield of carbonyl fluoride can be increased to preferably not less than 95% by mol, more preferably not less than 97% by mol, particularly preferably not less than 98% by mol.

Fourth Process for Producing Carbonyl Fluoride

The fourth process for producing carbonyl fluoride according to the invention comprises:

(I) a reaction step of feeding at least carbon monoxide and fluorine to a reactor to allow carbon monoxide to react with fluorine, and (II) a purification step of purifying crude carbonyl fluoride obtained in the reaction step (I), wherein the crude carbonyl fluoride contains at least fluorine, and the purification step (II) is a step of purifying the carbonyl fluoride by mixing the crude carbonyl fluoride with a compound (A) which is reactive to fluorine but inactive to carbonyl fluoride to form a reaction product (a) of fluorine and the compound (A) and removing the reaction product (a).

In the reaction step (I), a usual method of reacting carbon monoxide with fluorine can be used. For example, a method of performing the reaction under the conditions that the pressure inside the reactor is not less than atmospheric pressure or the feeding ratio of carbon monoxide to fluorine ($CO/F_2$) is less than 1.0 is available. Further, a method of reacting carbon monoxide with fluorine described in the first to the third processes for producing carbonyl fluoride according to the invention may be used.

The compound (A) used in the fourth process for producing carbonyl fluoride is not specifically restricted provided that the compound (A) is inactive to carbonyl fluoride and is such a compound that the reaction product (a) of the compound (A) and fluorine can be easily separated from carbonyl fluoride by means of distillation or the like. The compound (A), however, is preferably such a compound as to form a reaction product (a) which is liquid or solid at ordinary temperature and ordinary pressure. Examples of such compounds include methanol, ethanol, propanol, butanol, acetic acid, propionic acid, benzene, toluene, anthracene and hydrofluorocarbons ($C_xH_yF_z$, (x is preferably 2 or more)).

The crude carbonyl fluoride obtained in the reaction step (I) is aerated in the compound (A) to allow fluorine contained in the crude carbonyl fluoride to react with the compound (A), whereby the reaction product (a) is formed. When the reaction product (a) is, for example, liquid or solid under the conditions of ordinary temperature and ordinary pressure, it can be easily separated from carbonyl fluoride that is gas, and thereby high-purity carbonyl fluoride can be obtained.

According to the above process, there can be obtained carbonyl fluoride having a purity of usually not less than 95% by mol, preferably not less than 97% by mol, particularly preferably not less than 98% by mol.

When the carbonyl fluoride gas obtained in the first to the fourth processes for producing carbonyl fluoride according to the invention contains carbon monoxide, the following steps may be carried out to treat the carbon monoxide.

(1) A step of separating carbonyl fluoride and carbon monoxide from each other by gas-liquid separation or gas-solid separation.

(2) A step of oxidizing carbon monoxide to form carbon dioxide and then treating this carbon dioxide.

By carrying out the step (1), a carbonyl fluoride gas of higher purity can be obtained. By carrying out the step (2), carbonyl fluoride can be produced safely without exhausting carbon monoxide.

Although any one of the steps (1) and (2) or both of them may be carried out, it is preferable to carry out both of them.

EXAMPLES

The present invention is further described with reference to the following examples, but it should be construed that the invention is in no way limited to those examples.

In the examples and the comparative examples, the carbonyl fluoride obtained was directly analyzed by connecting FTIR (available from Maidak Inc., model number: IGA-2000) to a carbonyl fluoride production apparatus shown in FIG. 1. To the connecting line between the carbonyl fluoride production apparatus and FTIR, a feed line for nitrogen gas for diluting was connected, and the resulting carbonyl fluoride was appropriately diluted with nitrogen, followed by analysis.

In the examples and the comparative examples, the yield of carbonyl fluoride and the reaction selectivity of $CF_4$ were determined by the following formulas.

$$COF_2 \text{yield} = [COF_2]/[F_2] \quad (5)$$

$$CF_4 \text{selectivity} = [CF_4]/([CF_4]+[COF_2]+[CO_2]) \quad (6)$$

Examples 1-5

The pressure inside a nickel reactor (inner diameter 16.7 mm×length 300 mm) was reduced by means of a pressure reducing pump. Then, at a reactor internal pressure shown in Table 1, carbon monoxide (purity: 99.95%) and fluorine (purity: 99.9%) were each independently fed to the reactor at a flow rate of 30 sccm ($CO/F_2$ (by mol): 1.0) to start the reaction at room temperature. As the temperature inside the reactor, a temperature at the meeting point of carbon monoxide and fluorine was measured. It was confirmed that the maximum temperature inside the reactor appeared at this meeting point. In Table 1, the reactor internal temperature in the steady state is set forth.

The resulting gas was appropriately diluted with nitrogen, and gas composition was analyzed by FTIR. The result is set forth in Table 1.

TABLE 1

|  | Ex. 1 | Ex. 2 | Ex. 3 | Ex. 4 | Ex. 5 |
|---|---|---|---|---|---|
| CO (sccm) | 30 | 30 | 30 | 30 | 30 |
| $F_2$ (sccm) | 30 | 30 | 30 | 30 | 30 |
| $CO/F_2$ (by mol) | 1.0 | 1.0 | 1.0 | 1.0 | 1.0 |
| Pressure (kPa) | 100.8 | 97.0 | 90.6 | 70.1 | 47.2 |
| Temperature (° C.) | 175 | 117 | 118 | 118 | 122 |
| $COF_2$ yield (% by mol) | 99.0 | 98.7 | 98.6 | 97.7 | 97.4 |
| $CF_4$ selectivity (% by mol) | 1.62 | 1.70 | 1.43 | 1.10 | 1.10 |

Examples 6-8

The pressure inside a nickel reactor (inner diameter 16.7 mm×length 300 mm) equipped with a cooling system was reduced by means of a pressure reducing pump. Then, under the conditions of a reactor internal pressure of 100.1 kPa, carbon monoxide (purity: 99.95%) and fluorine (purity: 99%) were each independently fed to the reactor at flow rates shown in Table 2 to start the reaction at room temperature. As the temperature inside the reactor, a temperature at the meeting point of carbon monoxide and fluorine was measured. It was confirmed that the maximum temperature inside the reactor appeared at this meeting point. In Table 2, the reactor internal temperature in the steady state is set forth.

The resulting gas was appropriately diluted with nitrogen, and gas composition was analyzed by FTIR. The result is set forth in Table 2.

TABLE 2

|  | Ex. 6 | Ex. 7 | Ex. 8 |
|---|---|---|---|
| CO (sccm) | 30 | 60 | 90 |
| $F_2$ (sccm) | 30 | 30 | 30 |
| $CO/F_2$ (by mol) | 1.0 | 2.0 | 3.0 |
| Pressure (kPa) | 100.1 | 100.1 | 100.1 |
| Temperature (° C.) | 185 | 160 | 130 |
| $COF_2$ yield (% by mol) | 97.7 | 97.8 | 97.8 |
| $CF_4$ selectivity (% by mol) | 1.40 | 1.34 | 1.34 |

Examples 9-13

To a gas-mixing unit, fluorine (purity: 99%) and nitrogen (purity: 99.9%) were fed at flow rates shown in Table 3, and they were mixed. The pressure inside a nickel reactor (inner diameter 16.7 mm×length 300 mm) equipped with a cooling system was reduced by means of a pressure reducing pump. Then, under the conditions of a reactor internal pressure of 100.1 kPa, the mixed gas obtained above and carbon monoxide (purity: 99.95%) were fed to the reactor at flow rates shown in Table 3 to start the reaction at room temperature. As the temperature inside the reactor, a temperature at the meeting point of carbon monoxide and fluorine was measured. It was confirmed that the maximum temperature inside the reactor appeared at this meeting point. In Table 3, the reactor internal temperature in the steady state is set forth.

The resulting gas was appropriately diluted with nitrogen, and gas composition was analyzed by FTIR. The result is set forth in Table 3.

TABLE 3

|  | Ex. 9 | Ex. 10 | Ex. 11 | Ex. 12 | Ex. 13 |
|---|---|---|---|---|---|
| CO (sccm) | 30 | 30 | 30 | 60 | 90 |
| $F_2$ (sccm) | 30 | 30 | 30 | 30 | 30 |
| $N_2$ (sccm) | 30 | 60 | 90 | 90 | 90 |
| Mixed gas (sccm) | 60 | 90 | 120 | 120 | 120 |
| $CO/F_2$ (by mol) | 1.0 | 1.0 | 1.0 | 2.0 | 3.0 |
| $F_2/N_2$ (by mol) | 1.0 | 0.5 | 0.33 | 0.33 | 0.33 |
| Pressure (kPa) | 100.1 | 100.1 | 100.1 | 100.1 | 100.1 |
| Temperature (° C.) | 185 | 185 | 162 | 187 | 188 |
| $COF_2$ yield (% by mol) | 98.8 | 99.2 | 99.3 | 99.5 | 99.3 |
| $CF_4$ selectivity (% by mol) | 0.77 | 0.51 | 0.39 | 0.36 | 0.36 |

INDUSTRIAL APPLICABILITY

According to the present invention, high-purity carbonyl fluoride can be produced safely and easily by allowing carbon monoxide to directly react with fluorine. Further, carbonyl fluoride having a low content of $CF_4$ can be produced by suppressing a side reaction of $CF_4$ formation during the course of the reaction of carbon monoxide with fluorine. Such high-purity carbonyl fluoride can be used as, for example, a cleaning gas for a plasma CVD apparatus that is used in the semiconductor manufacturing process.

What is claimed is:

1. A process for producing carbonyl fluoride, comprising feeding carbon monoxide and fluorine to a reactor and allowing carbon monoxide to react with fluorine under the conditions of a reactor internal pressure of less than atmospheric pressure.

2. A process for producing carbonyl fluoride, comprising feeding carbon monoxide and fluorine to a reactor in a molar ratio ($CO/F_2$) of not less than 1.0 to allow carbon monoxide to react with fluorine.

3. A process for producing carbonyl fluoride, comprising previously mixing fluorine with nitrogen and feeding carbon monoxide and the mixed gas of fluorine and nitrogen to a reactor in a molar ratio of carbon monoxide to fluorine ($CO/F_2$) of not less than 1.0 to allow carbon monoxide to react with fluorine.

4. A process for producing carbonyl fluoride, comprising:
   (I) a reaction step of feeding at least carbon monoxide and fluorine to a reactor to allow carbon monoxide to react with fluorine, and
   (II) a purification step of purifying crude carbonyl fluoride obtained in the reaction step (I),
   wherein the crude carbonyl fluoride contains at least fluorine, and the purification step (II) is a step of purifying the carbonyl fluoride by mixing the crude carbonyl fluoride with a compound (A) which is reactive to fluorine but inactive to carbonyl fluoride to form a reaction product (a) of fluorine and the compound (A) and removing the reaction product (a).

5. The process for producing carbonyl fluoride as claimed in claim 4, wherein carbon monoxide is allowed to react with fluorine under the conditions of a reactor internal pressure of less than atmospheric pressure.

6. The process for producing carbonyl fluoride as claimed in claim 1, wherein carbon monoxide and fluorine are fed to a reactor in a molar ratio ($CO/F_2$) of not less than 1.0.

7. The process for producing carbonyl fluoride as claimed in claim 1, wherein fluorine is previously mixed with nitrogen, and carbon monoxide and the mixed gas of fluorine and nitrogen are fed to a reactor.

8. The process for producing carbonyl fluoride as claimed in claim 3, wherein the mixing molar ratio of fluorine to nitrogen ($F_2/N_2$) is not more than 1.5.

9. The process for producing carbonyl fluoride as claimed in claim 1, wherein the temperature inside the reactor is not higher than the endurable temperature of the reactor.

10. The process for producing carbonyl fluoride as claimed in claim 1, wherein the yield of carbonyl fluoride is not less than 95% by mol.

11. The process for producing carbonyl fluoride as claimed in a claim 1, wherein the reaction selectivity of carbon tetrafluoride is not more than 2.0% by mol.

12. The process for producing carbonyl fluoride as claimed in claim 4, wherein carbon monoxide and fluorine and fed to a reactor in a molar ratio ($CO/F_2$) of not less than 1.0.

13. The process for producing carbonyl fluoride as claimed in claim 4, wherein fluorine is previously mixed with nitrogen, and carbon monoxide and the mixed gas of fluorine and nitrogen are fed to a rector.

14. The process for producing carbonyl fluoride as claimed in claim 5, wherein fluorine is previously mixed with nitrogen, and carbon monoxide and the mixed gas of fluorine and nitrogen are fed to a rector.

15. The process for producing carbonyl fluoride as claimed in claim 7, wherein the mixing molar ratio of fluorine to nitrogen ($F_2/N_2$) is not more than 1.5.

16. The process for producing carbonyl fluoride as claimed in claim 2, wherein the temperature inside the reactor is not higher than the endurable temperature of the reactor.

17. The process for producing carbonyl fluoride as claimed in claim 3, wherein the temperature inside the reactor is not higher than the endurable temperature of the reactor.

18. The process for producing carbonyl fluoride as claimed in claim 4, wherein the temperature inside the reactor is not higher than the endurable temperature of the reactor.

19. The process for producing carbonyl fluoride as claimed in claim 2, wherein the yield of carbonyl fluoride is not less than 95% by mol.

20. The process for producing carbonyl fluoride as claimed in claim 3, wherein the yield of carbonyl fluoride is not less than 95% by mol.

21. The process for producing carbonyl fluoride as claimed in claim 4, wherein the yield of carbonyl fluoride is not less than 95% by mol.

22. The process for producing carbonyl fluoride as claimed in claim 2, wherein the reaction selectivity of carbon tetrafluoride is not more than 2.0% by mol.

23. The process for producing carbonyl fluoride as claimed in claim 3, wherein the reaction selectivity of carbon tetrafluoride is not more than 2.0% by mol.

* * * * *